US009782961B2

(12) United States Patent
Krieg et al.

(10) Patent No.: US 9,782,961 B2
(45) Date of Patent: Oct. 10, 2017

(54) METHODS FOR BONDING METAL AND THERMOPLASTIC COMPONENTS

(71) Applicant: THE BOEING COMPANY, Seal Beach, CA (US)

(72) Inventors: Kristin L. Krieg, Sammamish, WA (US); Kay Y. Blohowiak, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 523 days.

(21) Appl. No.: 14/287,935

(22) Filed: May 27, 2014

(65) Prior Publication Data

US 2015/0343753 A1    Dec. 3, 2015

(51) Int. Cl.
| | |
|---|---|
| F02M 35/10 | (2006.01) |
| B32B 37/14 | (2006.01) |
| B32B 37/24 | (2006.01) |
| B32B 37/12 | (2006.01) |
| B32B 38/00 | (2006.01) |
| B32B 15/08 | (2006.01) |
| B32B 15/092 | (2006.01) |
| B32B 15/095 | (2006.01) |
| B32B 7/12 | (2006.01) |
| B29C 45/14 | (2006.01) |
| B29L 31/30 | (2006.01) |

(Continued)

(52) U.S. Cl.
CPC ...... *B32B 37/144* (2013.01); *B29C 45/14311* (2013.01); *B32B 7/12* (2013.01); *B32B 15/08* (2013.01); *B32B 15/092* (2013.01); *B32B 15/095* (2013.01); *B32B 37/12* (2013.01); *B32B 37/24* (2013.01); *B32B 38/004* (2013.01); *B29K 2071/00* (2013.01); *B29L 2031/3002* (2013.01); *B29L 2031/7288* (2013.01); *B32B 2037/1253* (2013.01); *B32B 2038/0076* (2013.01); *B32B 2250/03* (2013.01); *B32B 2309/025* (2013.01); *B32B 2311/00* (2013.01); *B32B 2363/00* (2013.01); *B32B 2398/20* (2013.01); *B32B 2605/18* (2013.01); *B64D 45/02* (2013.01); *F16B 11/006* (2013.01); *Y10T 428/31529* (2015.04); *Y10T 428/31605* (2015.04); *Y10T 428/31678* (2015.04); *Y10T 428/31681* (2015.04)

(58) Field of Classification Search
None
See application file for complete search history.

(56) References Cited

U.S. PATENT DOCUMENTS 3,445,559 A   5/1969 Siteman
4,382,049 A   5/1983 Hofmeister et al.
(Continued)

OTHER PUBLICATIONS

Extended European Search Report of Application No. 15165353.2, Jan. 27, 2016, 11 pages.

(Continued)

*Primary Examiner* — Gregory Webb
(74) *Attorney, Agent, or Firm* — Armstrong Teasdale LLP

(57) ABSTRACT

A method for bonding components is provided. The method includes preparing a surface of a metal component, applying a film adhesive to the prepared surface, forming a thermoplastic component using injection molding such that the film adhesive is positioned between the metal component and the thermoplastic component, and curing the film adhesive.

15 Claims, 3 Drawing Sheets

(51) Int. Cl.
  *B29L 31/00* (2006.01)
  *B29K 71/00* (2006.01)
  *B64D 45/02* (2006.01)
  *F16B 11/00* (2006.01)

(56) References Cited

U.S. PATENT DOCUMENTS

| | | | |
|---|---|---|---|
| 4,630,168 A | 12/1986 | Hunt | |
| 5,761,801 A * | 6/1998 | Gebhardt | H05K 3/045 174/255 |
| 5,945,643 A * | 8/1999 | Casser | B29C 70/086 181/208 |
| 6,197,145 B1 * | 3/2001 | Todd | B29C 45/14811 156/245 |
| 6,409,859 B1 * | 6/2002 | Chung | 118/258 |
| 2006/0127684 A1 | 6/2006 | Naritomi et al. | |
| 2007/0210444 A1 | 9/2007 | Chang et al. | |
| 2009/0123745 A1 | 5/2009 | Gehrett et al. | |
| 2012/0321906 A1 * | 12/2012 | McCrea | C08J 7/04 428/613 |
| 2013/0075026 A1 | 3/2013 | Chang et al. | |
| 2013/0101860 A1 | 4/2013 | Zhou et al. | |
| 2013/0143058 A1 * | 6/2013 | McCrea | C08J 7/04 428/551 |
| 2013/0196170 A1 * | 8/2013 | Tomantschger | C08J 7/123 428/551 |
| 2013/0259604 A1 | 10/2013 | Whitlock et al. | |
| 2014/0292930 A1 * | 10/2014 | Zuo | B41J 2/1623 347/44 |

OTHER PUBLICATIONS

U.S. Appl. No. 14/206,145, filed Mar. 12, 2014.
U.S. Appl. No. 14/174,550, filed Feb. 6, 2014.
Partial European Search Report for Application No. 15165353.2, Oct. 2, 2015, 6 pages.

* cited by examiner

METHODS FOR BONDING METAL AND THERMOPLASTIC COMPONENTS

BACKGROUND

The field of the disclosure relates generally to bonding components, and, more particularly, to bonding metal and thermoplastic components using a film adhesive.

At least some known assemblies (e.g., in the aircraft industry) include parts that combine metal and thermoplastic components. To assemble such parts, thermoplastic components may be formed with one or more mechanical features that facilitate coupling the thermoplastic components to associated metal components. For example, a thermoplastic component may be formed on and around a metal component using injection molding to mechanically interlock with the metal component. However, under stress, the thermoplastic component may break or pop off of the metal component. Accordingly, at least some known assemblies include metal and thermoplastic components bonded to one another using an adhesive.

At least some existing bonding solutions employ secondary bonding. These solutions have a number of drawbacks, including additional surface preparation steps in order to achieve robust and cohesive failure modes, which adds cost and equipment. Secondary joining operations may also lead to longer flow times to manufacture parts. Moreover, secondary bonding operations may also limit integration possibilities for hybrid thermoplastic-metal parts.

BRIEF DESCRIPTION

In one aspect a method for bonding components is provided. The method includes preparing a surface of a metal component, applying a film adhesive to the prepared surface, forming a thermoplastic component using injection molding such that the film adhesive is positioned between the metal component and the thermoplastic component, and curing the film adhesive.

In another aspect, a method for forming a fastener having a dielectric cap is provided. The method includes preparing a surface on a head of the fastener, applying a film adhesive to the prepared surface, forming the dielectric cap using injection molding such that the film adhesive is positioned between the fastener head and the dielectric cap, and curing the film adhesive to bond the dielectric cap to the fastener head.

In yet another aspect a part is provided. The part includes a metal component, a thermoplastic component, and a film adhesive positioned between the metal and thermoplastic components, the film adhesive bonding the metal component to the thermoplastic component, wherein the part is fabricated by applying the film adhesive to a surface of the metal component, forming the thermoplastic component using injection molding, and curing the film adhesive after the injection molding.

DETAILED DESCRIPTION

The systems and methods described herein facilitate bonding metal and thermoplastic components. The methods include applying a film adhesive to a metal component and forming the thermoplastic component on the metal component and film adhesive using injection molding.

Figure 1:
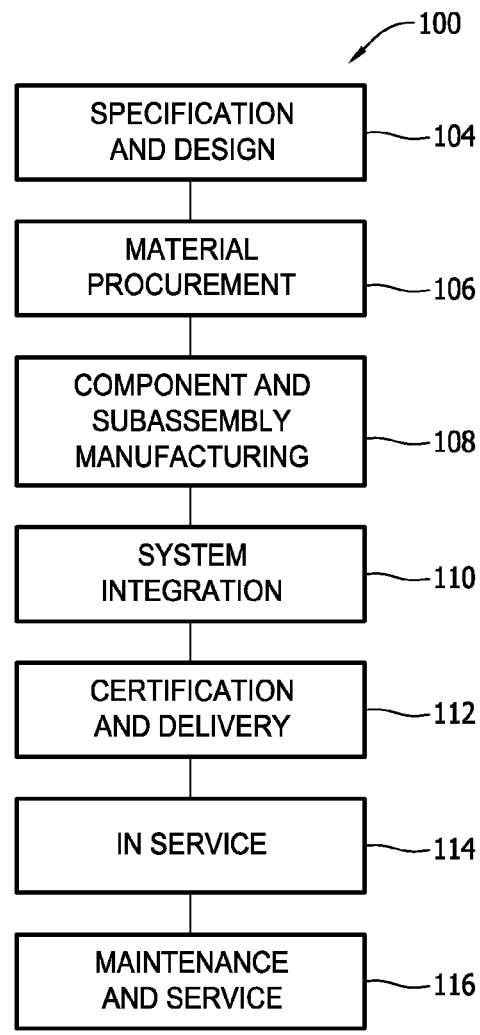
FIG. 1 is a flow diagram of an exemplary aircraft production and service methodology.
Figure 2:
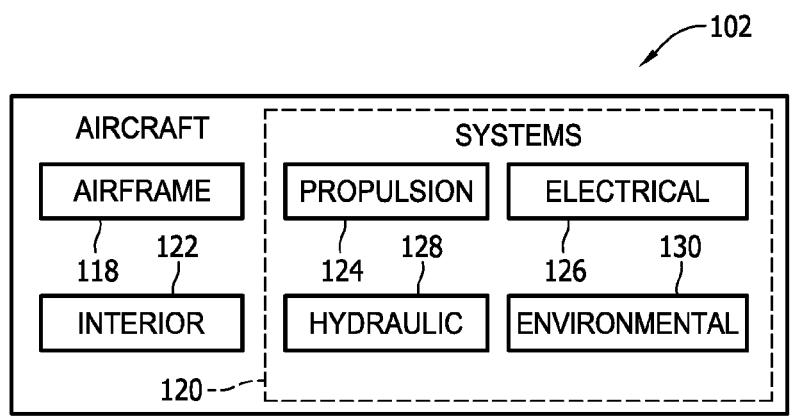
FIG. 2 is a block diagram of an aircraft.

Referring more particularly to the drawings, implementations of the disclosure may be described in the context of an aircraft manufacturing and service method 100 as shown in FIG. 1 and an aircraft 102 as shown in FIG. 2. During pre-production, exemplary method 100 may include specification and design 104 of aircraft 102 and material procurement 106. During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatuses and methods implemented herein may be employed during any one or more of the stages of production and service method 100. For example, components or subassemblies corresponding to production process 108 may be fabricated or manufactured in a manner similar to components or subassemblies produced while aircraft 102 is in service. Also, one or more apparatus implementations, method implementations, or a combination thereof may be utilized during production stages 108 and 110, for example, by substantially expediting assembly of or reducing the cost of aircraft 102. Similarly, one or more of apparatus implementations, method implementations, or a combination thereof may be utilized while the aircraft 102 is in service, for example and without limitation, to maintenance and service 116.

Figure 3:
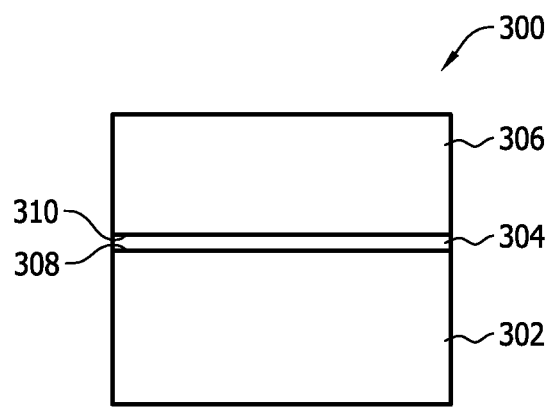
FIG. 3 is a schematic view of a simple part that may be included on the aircraft shown in FIG. 2.

FIG. 3 is a schematic diagram of a simple part 300 that includes a metal component 302, an adhesive 304, and an injection molded thermoplastic component 306. Adhesive 304 bonds metal component 302 to thermoplastic component 306, as described in detail herein. Simple part 300 may be included, for example, on aircraft 102 (shown in FIG. 2).

As used herein, part 300 is referred to as a 'simple' part because a single interface 308 of metal component 302 is bonded to a single interface 310 of thermoplastic component 306. In one example implementation, metal component 302 is a fastener (e.g., a bolt, a screw, and/or any other type of fastening device having a head and a shank) and thermoplastic component 306 is a dielectric cap coupled to the head of fastener via adhesive 304. For example, metal component 302 may be a titanium fastener having a diameter of 0.485 inches, thermoplastic component 306 may be an unfilled 450G polyetheretherketone (PEEK) cap, and the formed simple part 300 may be an integral dielectric top (IDT) fastener. Alternatively, metal component 302 and thermoplastic component 306 may be any components that may be bonded to one another as described herein. For example, in some implementations, thermoplastic component 306 is polyaryletherketone (PAEK, PEKK), polyphenylene sulfide (PPS), polyetherimide (PEI), polycarbonate (PC), polyarylsulfone (PPS, PPSU, PSU), or polyphthalamide (PPA).

Figure 4:
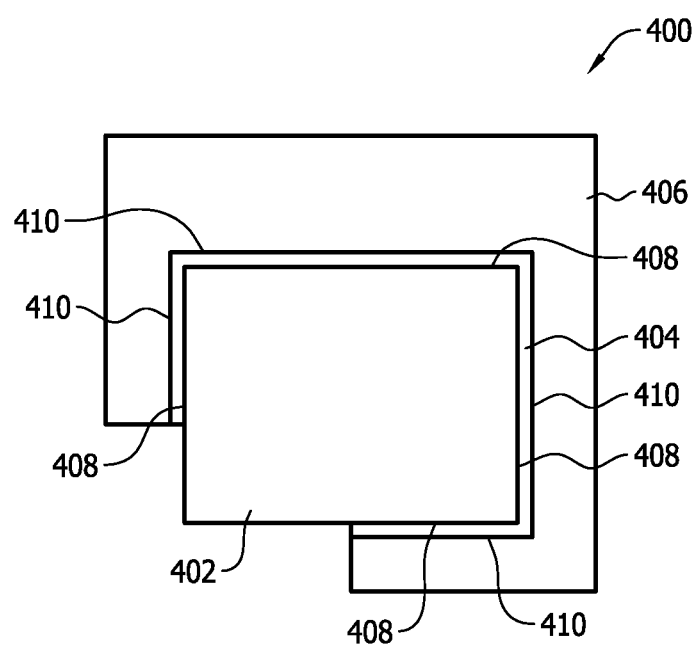
FIG. 4 is a schematic view of a complex part that may be included on the aircraft shown in FIG. 2.

FIG. 4 is a schematic diagram of a complex part 400 that includes a metal component 402, an adhesive 404, and an injection molded thermoplastic component 406. Similar to simple part 300 (shown in FIG. 3), adhesive 404 bonds metal component 402 to thermoplastic component 406, as described in detail herein. Complex part 400 may be included, for example, on aircraft 102 (shown in FIG. 2).

As used herein, part 400 is referred to as a 'complex' part because multiple interfaces 408 of metal component 402 are bonded to multiple interfaces 410 of thermoplastic component 406. Accordingly, as compared to simple part 300, complex part 400 is relatively complex. Notably, metal component 402 and thermoplastic component 406 may be any elements that may be bonded to one another as described herein.

Figure 5:
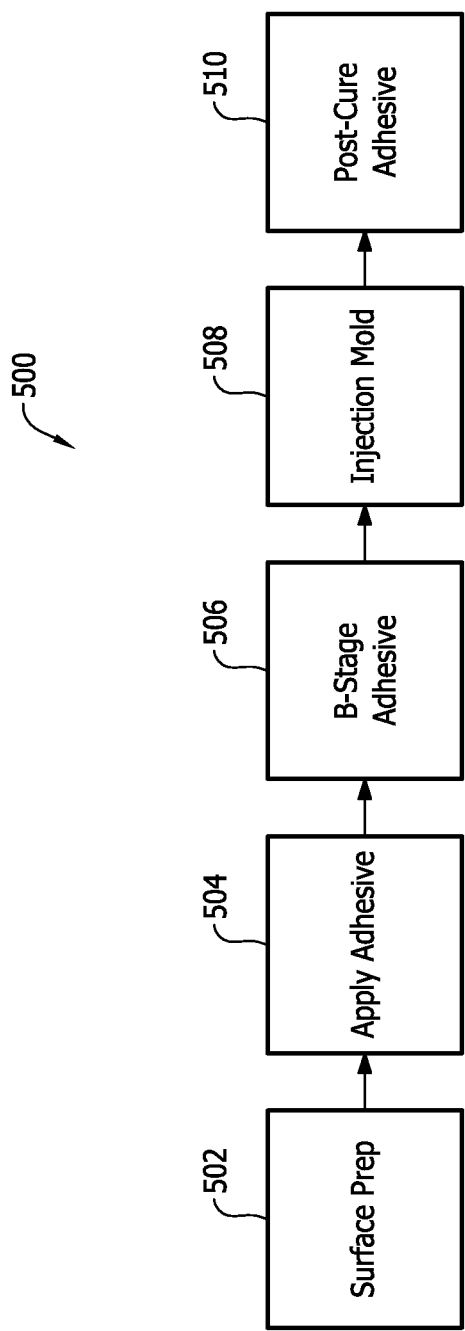
FIG. 5 is a flow diagram that may be used to form the parts shown in FIGS. 3 and 4.

FIG. 5 is a flow diagram of an exemplary method 500 for forming a part, such as simple part 300 (shown in FIG. 3) or complex part 400 (shown in FIG. 4). Method 500 includes preparing 502 a surface, applying 504 adhesive to the surface, B-staging 506 the adhesive (i.e., partially pre-curing or setting the adhesive), performing 508 an injection molding process, and curing 510 the adhesive after the injection molding process. The steps of method 500 are described in detail below.

Method 500 begins by preparing 502 a surface on the metal component. That is, in some implementations, the surface to which the adhesive will ultimately be applied may initially include a coating (e.g., an aluminum-pigmented coating that acts as a dry lubricant) that would interfere with performance of the adhesive. Accordingly, the surface may be prepared 502, for example, by grit blasting the surface to remove any such coating. For example, the surface may be grit blasted with #180 grit alumina. To further prepare 502 the surface, a sol-gel coating (e.g., Boegel EPII sol-gel) may be applied to the surface after the grit blasting. To finalize the preparation 502, the surface of the metal component may be primed with a corrosion inhibiting modified epoxy primer.

After preparation 502, an adhesive is applied 504 to the surface. When the metal component is a fastener, the surface may be the head of the fastener, which may be relatively small (e.g., 0.5 square inches). In the exemplary implementation, the adhesive is a film adhesive, and more specifically, an epoxy film adhesive. For example, the adhesive may be EA9696U (0.03 lb/ft$^2$) from Henkel Corp. Using an adhesive film ensures that the profile of the adhesive is relatively uniform. In the exemplary implementation, the adhesive is a toughened epoxy adhesive that provides relatively strong environmental durability and mechanical strength for structural bonding applications. Further, the adhesive cures at 250° Fahrenheit (F) or lower and is selected for its ability to withstand short-term exposure to the relatively high thermoplastic processing temperatures and adhesive kinetics.

Alternatively, the adhesive may be any suitable adhesive that enables method 500 to be performed as described herein. For example, in some implementations, depending on the application, the adhesive may cure at higher temperatures. Further, in some implementations, the film adhesive is a urethane or polyimide adhesive. Moreover, in some implementations, the adhesive may be a spray-on adhesive. In the exemplary implementation, the adhesive is relatively thin (e.g., 0.002 to 0.005 inches thick) to facilitate reducing overflow and vent blocking of an injection molding tool during the injection molding process. However, depending on the part to be formed, the adhesive may be thicker (e.g., up to 0.010 inches thick) in some implementations.

B-staging 506 is performed on the adhesive to facilitate restraining the flow of the adhesive during the subsequent injection molding process. That is, B-staging 506 is an intermediate process performed in an oven that prepares the adhesive for the subsequent bonding operation by advancing the adhesive through a viscosity profile. Parameters for B-staging 506 are selected based on predetermined cure kinetics of the adhesive. For example, in some implementations, B-staging 506 is performed for approximately 30 minutes at approximately 180° F. In other implementations, B-staging 506 is performed for approximately 30 minutes at approximately 210° F. Alternatively, B-staging 506 may be performed using any suitable parameters that enable method 500 to be performed as described herein. For example, B-staging 506 may be performed for a period from 5 minutes to 2 hours, at temperatures between 150° F. and 250° F. In some implementations, B-staging 506 is not performed.

The metal component and adhesive may be stored (e.g., for 24 hours) after B-staging 506 and prior to performing 508 injection molding. After B-staging 506, the injection molding process is performed 508. Specifically, at least a portion of the metal component (with the applied adhesive) is placed in an injection molding tool, and the thermoplastic component is formed on the metal component and adhesive using injection molding. During injection molding, the metal component and adhesive are subject to relatively high temperatures (e.g., approximately 690° F.) and pressures (e.g., 8,000 psi) for a relatively short time (e.g., a few seconds). In some implementations, injection molding is performed at up to 725° F. and up to 15,000 psi. However, the B-staging 506 reduces flow of the adhesive during the injection molding by partially curing the adhesive.

The adhesive is cured 510 after the injection molding process is performed 508. For some thermoplastics, such as PEEK, the performance of the thermoplastic component is improved when the material is amorphous. Accordingly, during curing 510, in the exemplary implementation, temperatures are kept below a glass transition temperature of the thermoplastic component (e.g., about 290° F.). For example, curing 510 may be performed for approximately 90 minutes at approximately 250° F. with temperature ramps of 7° F./minute at approximately 25 psi. Alternatively, curing 510 may be performed using any suitable parameters that enable method 500 to be performed as described herein. For example, curing 510 may be performed at temperatures between 150° F. and 270° F. and at pressures from 10 psi to 95 psi. Curing 510 is performed in a heated press in the exemplary implementation.

Method 500 forms a high strength bond between the metal component and the thermoplastic component. For example, based upon experimental results, at 75° F., resultant bonds produce a tension strength between 1400 psi and 1600 psi to separate a titanium fastener from a thermoplastic cap when the fastener and cap were bonded using the systems and methods described herein. In contrast, at least some known bonding techniques may produce a tension strength of approximately 600 psi to separate bonded metal and thermoplastic components. Furthermore, the bonding methods described herein are relatively robust and repeatable.

The implementations described herein provide systems and methods for bonding metal and thermoplastic components. The methods include applying an epoxy adhesive to a metal component, B-staging the adhesive, and forming the thermoplastic component on the metal component and adhesive using injection molding. Notably, B-staging the adhesive reduces flow of the adhesive during the injection molding process.

The implementations described herein provide improvements over at least some known bonding methods. As compared to at least some known bonding methods, the bond formed between metal and thermoplastic components using the methods described herein is a stronger bond. Further, because the methods described herein enable the adhesive to withstand injection molding processes, parts including metal and thermoplastic components may be formed relatively quickly and easily.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for bonding components, said method comprising:
   preparing a surface of a metal component;
   applying a film adhesive to the prepared surface;
   forming a thermoplastic component using injection molding such that the film adhesive is positioned between the metal component and the thermoplastic component; and
   curing the film adhesive.

2. A method in accordance with claim 1, wherein applying the film adhesive comprises applying an epoxy film adhesive.

3. A method in accordance with claim 1, further comprising B-staging the film adhesive prior to forming the thermoplastic component.

4. A method in accordance with claim 3, wherein B-staging the film adhesive comprises exposing the film adhesive to temperatures in a range of approximately 150° F. to 210° F. for a time period in a range of approximately five minutes to two hours.

5. A method in accordance with claim 1, wherein preparing the surface of a metal component comprises preparing a head of a titanium fastener.

6. A method in accordance with claim 1, wherein forming the thermoplastic component comprises forming a polyetheretherketone (PEEK) component.

7. A method in accordance with claim 1, wherein curing the film adhesive comprises curing the film adhesive using temperatures in a range of approximately 150° F. to 270° F. at pressures in a range of approximately 10 psi to 95 psi.

8. A method in accordance with claim 1, wherein the metal component comprises a head of a fastener and the thermoplastic component comprises a dielectric cap,
   wherein preparing the surface of the metal component comprises preparing a surface on the head of the fastener;
   wherein applying the film adhesive to the prepared surface comprises applying the film adhesive to the head of the fastener;
   wherein forming the thermoplastic component comprises forming the dielectric cap using injection molding such that the film adhesive is positioned between the fastener head and the dielectric cap; and
   wherein curing the film adhesive comprises curing the film adhesive to bond the dielectric cap to the fastener head.

9. A method in accordance with claim 8, wherein applying the film adhesive comprises applying an epoxy film adhesive.

10. A method in accordance with claim 8, further comprising B-staging the film adhesive prior to forming the dielectric cap.

11. A method in accordance with claim 10, wherein B-staging the film adhesive comprises exposing the film adhesive to temperatures in a range of approximately 150° F. to 210° F. for a time period in a range of approximately five minutes to two hours.

12. A method in accordance with claim 8, wherein curing the film adhesive comprises curing the film adhesive using temperatures in a range of approximately 150° F. to 270° F. at pressures in a range of approximately 10 psi to 95 psi.

13. A method in accordance with claim 8, wherein curing the film adhesive comprises curing the film adhesive for approximately 90 minutes at approximately 250° F.

14. A method in accordance with claim 8, wherein preparing the surface comprises preparing a head of a titanium fastener.

15. A method in accordance with claim 8, wherein forming the dielectric cap comprises forming a polyetheretherketone (PEEK) cap.

* * * * *